United States Patent
Sato et al.

(10) Patent No.: US 11,709,959 B2
(45) Date of Patent: Jul. 25, 2023

(54) INFORMATION PROCESSING APPARATUS AND INFORMATION PROCESSING METHOD

(71) Applicant: Nippon Telegraph and Telephone Corporation, Tokyo (JP)

(72) Inventors: Noriyuki Sato, Tokyo (JP); Takuo Kanamitsu, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 81 days.

(21) Appl. No.: 17/424,042

(22) PCT Filed: Jan. 16, 2020

(86) PCT No.: PCT/JP2020/001374
§ 371 (c)(1),
(2) Date: Jul. 19, 2021

(87) PCT Pub. No.: WO2020/158429
PCT Pub. Date: Aug. 6, 2020

(65) Prior Publication Data
US 2022/0100881 A1 Mar. 31, 2022

(30) Foreign Application Priority Data
Jan. 29, 2019 (JP) ................ 2019-012708

(51) Int. Cl.
*G06F 11/07* (2006.01)
*G06F 21/62* (2013.01)

(52) U.S. Cl.
CPC ........ *G06F 21/6218* (2013.01); *G06F 11/079* (2013.01); *G06F 11/0721* (2013.01)

(58) Field of Classification Search
CPC . G06F 11/0721; G06F 11/079; G06F 21/6218
See application file for complete search history.

(56) References Cited

U.S. PATENT DOCUMENTS

| | | | |
|---|---|---|---|
| 10,063,370 B2 * | 8/2018 | Temple | G06F 21/72 |
| 2011/0047417 A1 * | 2/2011 | Malnati | G06F 11/0751 714/E11.002 |
| 2014/0013108 A1 * | 1/2014 | Pellikka | H04L 63/0853 713/156 |

OTHER PUBLICATIONS wikipedia.com, "Digital Signal Processor," retrieved on Oct. 20, 2018, retrieved from URL <https://ja.wikipedia.org/wiki/デジタルシグナルプロセッサ >, 13 pages (With English Translation).

* cited by examiner

*Primary Examiner* — Nadeem Iqbal
(74) *Attorney, Agent, or Firm* — Fish & Richardson P.C.

(57) ABSTRACT

An information processing device includes: an identifier adding unit that adds identifiers including at least one type of valid identifier to each of a plurality of pieces of information; a plurality of input memories that hold the plurality of pieces of information and the identifiers, respectively; a plurality of output memories that hold a plurality of pieces of information processed by the processing unit and the identifiers added to the plurality of pieces of information, respectively; and an identifier inspecting and verifying unit that performs inspection and verification by comparing at least one identifier that becomes an inspecting and verifying target identifier among the identifiers to the valid identifier held in the input memory corresponding to the output memory that holds the inspecting and verifying target identifier.

8 Claims, 6 Drawing Sheets

INFORMATION PROCESSING APPARATUS AND INFORMATION PROCESSING METHOD

CROSS-REFERENCE TO RELATED APPLICATIONS

This application is a National Stage application under 35 U.S.C. § 371 of International Application No. PCT/JP2020/001374, having an International Filing Date of Jan. 16, 2020, which claims priority to Japanese Application Serial No. 2019-012708, filed on Jan. 29, 2019. The disclosure of the prior application is considered part of the disclosure of this application, and is incorporated in its entirety into this application.

TECHNICAL FIELD

The present invention relates to an information processing device and an information processing method.

BACKGROUND ART

Some related-art information processing devices include one processing unit, and process a plurality of pieces of information in the processing unit.

Such an information processing device includes a plurality of input memories and a plurality of output memories to process the plurality of pieces of information.

For example, for the information processing device that processes abbreviation the plurality of information for 1024 chs ("ch" is an abbreviation for a channel), the information processing device includes the plurality of input memories for 1024 chs and the plurality of output memories for 1024 chs.

When the processing unit is normal, the processing unit reads and processes the information on an N ch (N=0, 1, . . . , 1022, 1023) from the input memory of the N ch, and writes the post-processing information in the output memory of the N ch.

However, when the processing unit fails, sometimes the processing unit reads and processes the information on the N ch from the input memory of the N ch, and mistakenly writes the post-processing information in the output memory of an M (M=0, 1, . . . , 1022, 1023 and M≠N) ch. As a result, the information on the M ch different from the original is output to a receiver who should receive the information on the N ch.

However, in the related art, even if the processing unit fails as described above, there is no means for finding the failure in a short time.

Consequently, there is a problem in that a state in which the information different from the original is output is continued.

In particular, for digital signal processing using a Digital Signal Processor (DSP) as the processing unit (see Non Patent Literature 1), the processing has to be completed within a predetermined time (latency), and a processing speed tends to be prioritized.

For this reason, in the related art, improvement of processing errors such as ch switching is lightly treated.

CITATION LIST

Non Patent Literature

Non Patent Literature 1: "Digital Signal Processor", [online], [Searched on Jan. 7, 2019], Internet <URL: https://ja.wikipedia.org/wiki/digital signal processor>

SUMMARY OF THE INVENTION

Technical Problem

In view of the foregoing, a problem of the present invention is to discover the failure of the processing unit that processes the plurality of pieces of information in a short time.

Means for Solving the Problem

To solve the above-mentioned problem, according to the invention of first aspect, an information processing device includes: a processing unit configured to process a plurality of pieces of information; an identifier adding unit configured to add an identifier including at least one type of valid identifier to each of the plurality of pieces of information; a plurality of input memories configured to hold each of the plurality of pieces of information and each of the identifiers added to the plurality of pieces of information; a plurality of output memories configured to hold each of the plurality of pieces of information processed by the processing unit and each of the identifiers added to the plurality of processed pieces of information; and an identifier inspecting and verifying unit configured to perform inspection and verification by comparing at least one identifier that becomes an inspecting and verifying target identifier among the identifiers held in the output memories to the valid identifier held in the input memory corresponding to the output memory that holds the inspecting and verifying target identifier.

According to the invention of fourth aspect, an information processing method at an information processing device including a processing unit that processes a plurality of pieces of information, the information processing method includes, at the information processing device: adding an identifier including at least one type of valid identifier to each of the plurality of pieces of information; holding each of the plurality of pieces of information and each of the identifiers added to the plurality of pieces of information in a plurality of input memories; holding each of the plurality of pieces of information processed by the processing unit and each of the identifiers added to the plurality of processed pieces of information in a plurality of output memories; and performing inspection and verification by comparing at least one identifier that becomes an inspecting and verifying target identifier among the identifiers held in the output memories to the valid identifier held in the input memory corresponding to the output memory that holds the inspecting and verifying target identifier.

According to the invention of first and fourth aspects, whether the information to which the identifier is added is the target information, namely, whether the information to which the identifier is added is the information to be held in the output memory can be securely determined by inspecting and verifying at least one of the identifiers held in the output memories.

Thus, the failure of the processing unit that processes the plurality of pieces of information can be discovered in a short time.

According to the invention of second aspect, the information processing device of the first aspect further includes an error processing unit configured to perform error processing when the inspecting and verifying target identifier is not matched with the valid identifier held in the input memory corresponding to the output memory that holds the inspecting and verifying target identifier.

According to the invention of the fifth aspect, the information processing method of fourth aspect, at the information processing device, further includes performing error processing when the inspecting and verifying target identifier is not matched with the valid identifier held in the input memory corresponding to the output memory that holds the inspecting and verifying target identifier.

According to the invention of the second and fifth aspects, handling means can be provided when the failure of the processing unit is discovered.

According to the invention of the third aspect, in the information processing device of first or second aspect, the identifier adding unit adds the valid identifier to the information held in the input memory other than at least one input memory that holds the valid identifier.

According to the invention of the sixth aspect, the information processing method of fourth or fifth aspect, in which the adding of the identifier includes, at the information processing device, adding the valid identifier to the information held in the input memory other than at least one input memory that holds the valid identifier.

According to the invention of the third and sixth aspects, the identifiers to be inspected and verified can be switched, so that the failure of the processing unit can be determined for all the input pieces of information.

Effects of the Invention

According to the present invention, the failure of the processing unit that processes the plurality of information can be discovered in a short time.

DESCRIPTION OF EMBODIMENTS

Hereinafter, an embodiment for carrying out the present invention (hereinafter, referred to as a "present embodiment") will be described referring to the drawings.

First Embodiment

Configuration

Figure 1:
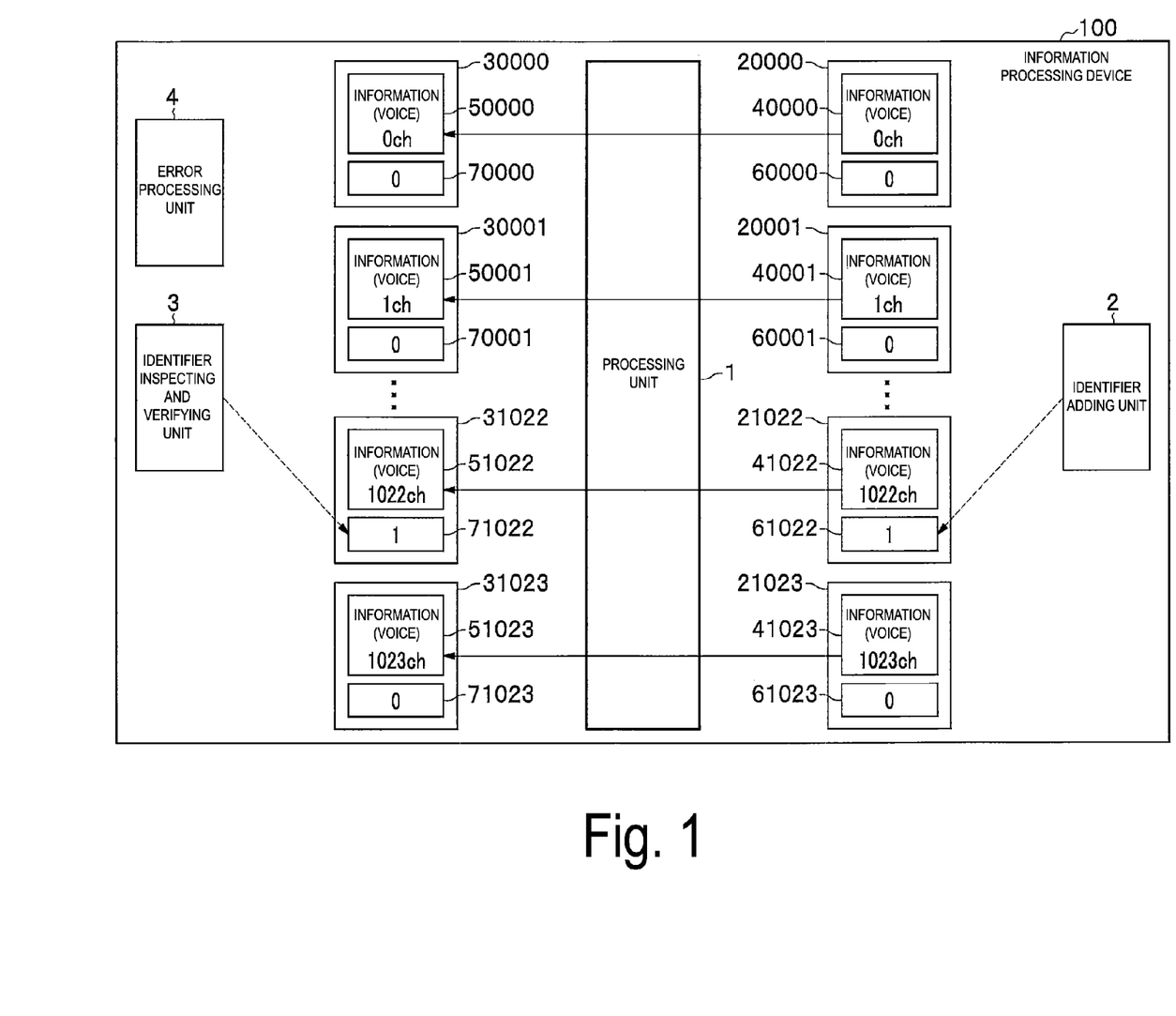
FIG. 1 is a functional block diagram illustrating an example of an information processing device according to a first embodiment, and is an explanatory view illustrating the case where a processing unit is normal.

As illustrated in FIG. 1, an information processing device 100 of the present embodiment includes a processing unit 1, input memories 20000 to 21023, output memories 30000 to 31023, an identifier adding unit 2, an identifier inspecting and verifying unit 3, and an error processing unit 4.

In the present embodiment, the description will be made under an assumption that the information processing device 100 processes a plurality of pieces of information for 1024 chs.

The processing unit 1 processes the plurality of pieces of information.

The information processing device 100 including one processing unit 1 is described in the present embodiment. However, the present invention can also be applied to the information processing device 100 including a plurality of processing units 1.

For example, the processing unit 1 is constructed with, but not limited to, a microcomputer and a DSP.

For example, the processing performed by the processing unit 1 includes, but not limited to, echo cancellation, codec conversion, and band compression.

The input memories 20000 to 21023 hold a plurality of information 40000 to 41023 for 1024 chs input to the information processing device 100, respectively.

The pieces of information 40000 to 41023 are pre-processing information to be processed by the processing unit 1.

For example, the pieces of information 40000 to 41023 include, but not limited to, voice.

The output memories 30000 to 31023 hold a plurality of pieces of information 50000 to 51023 for 1024 chs output from the information processing device 100 to a receiver (not illustrated), respectively.

The pieces of information 50000 to 51023 are post-processing information processed by the processing unit 1.

For example, the pieces of information 50000 to 51023 include, but not limited to, the voice.

When the processing unit 1 is normal, the processing unit 1 reads and processes the information on an N ch (N=0, 1, . . . , 1022, 1023) from the input memory of the N ch, and writes the post-processing information in the output memory of the N ch.

The identifier adding unit 2 adds identifiers 60000 to 61023, which identify the pieces of information 40000 to 41023, to the pieces of information 40000 to 41023, respectively.

In the present embodiment, the identifiers 60000 to 61023 are 1-bit binary data taking a binary value of "1" or "0".

The identifier having the value of "1" is a valid identifier, and the identifier having the value of "0" is an invalid identifier.

The input memories 20000 to 21023 include regions that hold the pieces of information 40000 to 41023 and regions that hold the identifier 60000 to 61023, and hold the pieces of information 40000 to 41023 and the identifier 60000 to 61023, respectively.

The identifier adding unit 2 can set one of the identifiers 60000 to 61023 to the valid identifier having the value of "1", and set the remaining invalid identifiers to the identifier having the value of "0".

In the example of FIG. 1, the valid identifier 61022 having the value of "1" is added to the information 40122, and the information 40122 and the identifier 61022 are held in the input memory 21022 of the 1022 ch.

The invalid identifiers 60000 to 61021, 61023 having the value of "0" are added to the pieces of information 40000 to 41021, 41023, and the pieces of information 40000 to 41021, 41023 and the identifiers 60000 to 61021, 61023 are held in the input memories 20000 to 21021, 21023 of the 0 ch to the 1021 ch, the 1023 ch, respectively.

When reading the information on the N ch from the input memory of N ch, the processing unit 1 also reads the identifier added to the information on the N ch.

When processing the information on N ch, the processing unit 1 retains the identifier added to the information on the N ch without changing the identifier.

The processing unit 1 writes the post-processing information on the N ch and the identifier added to the post-processing information of the N ch in the output memory of N ch.

The output memories 30000 to 31023 include regions that hold the pieces of post-processing information 50000 to 51023 and regions that hold the identifiers 70000 to 71023 added to the pieces of information 50000 to 51023, and hold the pieces of information 50000 to 51023 and the identifiers 70000 to 71023.

The identifier inspecting and verifying unit 3 inspects and verifies one of the identifiers 70000 to 71023 held in the output memories 30000 to 31023 as the inspecting and verifying target identifier.

The output memory in which the inspecting and verifying target identifier is held is an output memory corresponding to the input memory holding the valid identifier having the value of "1" (for example, a ch number is the same).

The identifier inspecting and verifying unit 3 compares the inspecting and verifying target identifier held in the output memory to the valid identifier held in the input memory corresponding to the output memory, and inspects and verifies the inspecting and verifying target.

Specifically, the identifier inspecting and verifying unit 3 reads the inspecting and verifying target identifier added to the post-processing information of the N ch from the output memory of N ch, and determines whether the read inspecting and verifying target identifier is matched with the identifier, which is held in the input memory (corresponding input memory) of the N ch and added to the pre-processing information on the N ch.

The identifier inspecting and verifying unit 3 grasps which one of the input memories 20000 to 21023 holds the identifier added by the identifier adding unit 2.

The error processing unit 4 performs error processing when the inspecting and verifying target identifier is not matched with the valid identifier held in the input memory corresponding to the memory that holds the inspecting and verifying target identifier as a result of the inspection and verification of the inspecting and verifying target identifier performed by the identifier inspecting and verifying unit 3. Specifically, when the inspecting and verifying target identifier that is read from the output memory of the N ch and added to the post-processing information on the N ch is not matched with the identifier that is held in the input memory of the N ch and added to the pre-processing information on the N ch, the error processing unit 4 determines that the processing unit 1 fails, and performs the error processing. For example, the error processing includes, but not limited to, notification to a maintenance person and a discard of the information in which the identifiers are not matched with each other.

An operation example of the information 41022 on the 1022 ch held in the input memory 21022 of the 1022 ch and the identifier 61022 that is added to information 41022 and has the value of "1" will be described below with reference to FIG. 1.

For this operation example, the identifier adding unit 2 sets the value of the identifier 61022 to "1", and sets the value of the other identifiers 60000 to 61021, 61023 to "0".

When the processing unit 1 is normal, the processing unit 1 reads the information 41022 on the 1022 ch and the identifier 61022 from the input memory 21022 of the 1022 ch, and processes the information 41022 on the 1022 ch and the identifier 61022.

After performing the processing, the processing unit 1 writes the post-processing information 51022 on the 1022 ch and the identifier 71022 that is not changed from the value of "1" in the output memory 31022 of the 1022 ch.

Since the identifier 61022 held in the input memory 21022 of the 1022 ch is the valid identifier having the value of "1", the identifier inspecting and verifying unit 3 treats the identifier 71022 held in the output memory 31022 of the 1022 ch as the inspecting and verifying target identifier.

The identifier inspecting and verifying unit 3 reads the identifier 71022 added to the post-processing information 51022 on the 1022 ch from the output memory 31022 of the 1022 ch, and determines whether the identifier 71022 is matched with the identifier 61022 that is held in the input memory 21022 of the 1022 ch and added to the pre-processing information on the 1022 ch. In this case, since the identifiers 71022, 61022 having the value of "1" are matched with each other, the processing unit 1 is determined to be normal.

The identifier inspecting and verifying unit 3 also determines that the post-processing information 51022 on the 1022 ch held in the output memory 31022 of the 1022 ch corresponds to the pre-processing information 41022 on the 1022 ch held in the input memory 21022 of the 1022 ch.

Figure 2:
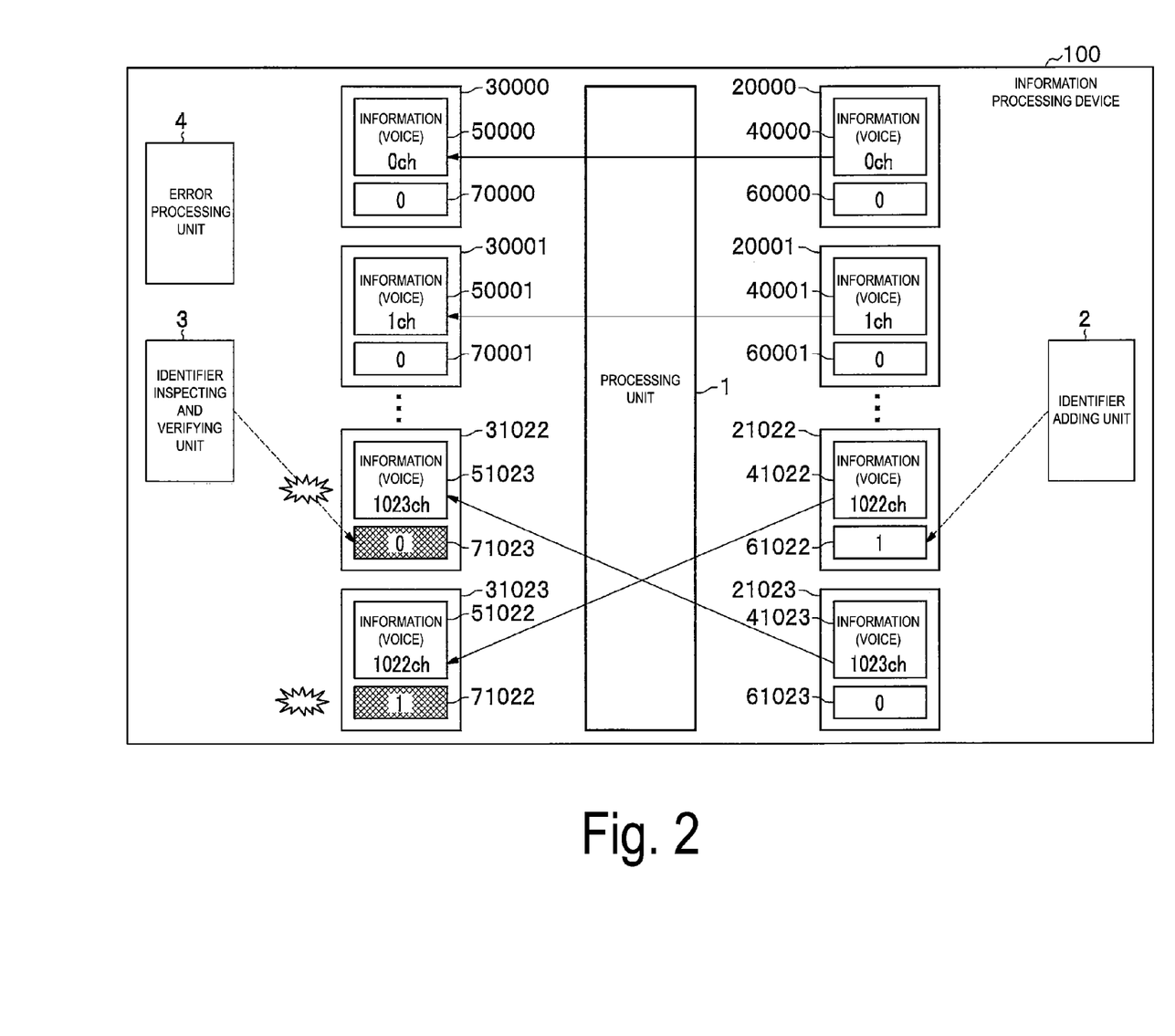
FIG. 2 is an explanatory view illustrating the case where the processing unit fails in the first embodiment.

When the processing unit 1 fails, as illustrated in FIG. 2, it is assumed that the output memory 31022 of the 1022 ch holds the post-processing information 51023 on the 1023 ch and the identifier 71023, which is added to the information 51023 and has the value of "0".

The identifier inspecting and verifying unit 3 inspects and verifies the identifier 71023 read from the output memory 31022 of the 1022 ch as the inspecting and verifying target identifier.

In this case, the value of "0" possessed by the identifier 71023 read from the output memory 31022 of the 1022 ch is not matched with the value of "1" possessed by the identifier 61022 that is held in the input memory 21022 of the 1022 ch and added to the pre-processing information 41022 on the 1022 ch.

For this reason, the identifier inspecting and verifying unit 3 determines that the processing unit 1 fails.

The identifier inspecting and verifying unit 3 also determines that the post-processing information 51023 on the 1023 ch held in the output memory 31022 of the 1022 ch does not correspond to the pre-processing information 41022 on the 1022 ch held in the input memory 21022 of the 1022 ch.

Thus, the error processing unit 4 performs the error processing on the post-processing information 51023 on the 1023 ch held in the output memory 31022 of the 1022 ch.

As illustrated in FIG. 2, it is assumed that the output memory 31023 of the 1023 ch holds the post-processing information 51022 on the 1022 ch and the identifier 71022, which is added to the information 51022 and has the value of "1".

In this case, when inspecting and verifying the identifier 71022 held in the output memory 31023, the identifier inspecting and verifying unit 3 can determine that the processing unit 1 fails.

This is because the value of "1" of the identifier 71022 and the value of "0" of the identifier 61023 held in the input memory 21023 of the 1023 ch are not matched with each other.

Thus, the error processing unit 4 can perform the error processing on the post-processing information 51022 on the 1022 ch held in the output memory 31023 of the 1023 ch.

The identifier adding unit 2 can switch the identifier having the value of "1" among the identifiers 60000 to 61023 over time.

For example, the identifier adding unit 2 can switch the identifier having the value of "1" from the identifier 61022 to the identifier 61023.

In this case, the values of the identifiers 60000 to 61022 become "0".

Since the identifier 61023 held in the input memory 21023 of the 1023 ch is the valid identifier having the value of "1", the identifier inspecting and verifying unit 3 treats the identifier 71023 held in the output memory 31023 of the 1023 ch as the inspecting and verifying target identifier after the processing unit 1 performs the processing.

The identifier inspecting and verifying unit 3 determines that the processing unit 1 is normal when the value of the identifier 71023 is matched with the identifier held in the input memory 21023 of the 1023 ch.

On the other hand, when the value of the identifier 71023 is not matched with the identifier held in the input memory 21023 of the 1023 ch, the identifier inspecting and verifying unit 3 determines that the processing unit 1 fails, and the error processing unit 4 can perform the error processing.

Furthermore, the identifier adding unit 2 can switch the identifier having the value of "1" to one of the identifiers 60000 to 61021 other than the identifier 61022, 61023, and the identifier inspecting and verifying unit 3 can perform the inspection and verification.

The identifier can be inspected and verified in any order.

As a result, the inspection and verification of all the 1024 chs can be performed, and the determination whether the processing unit 1 is normal can be made without any omission.

Processing

The processing of the information processing device 100 of the first embodiment will be described below with reference to FIG. 3.

The processing starts when the pieces of information for the 1024 chs are input to the information processing device 100.

First, the information processing device 100 causes the identifier adding unit 2 to add the identifier having the value of "0" or "1" to each of the pieces of information for the 1024 chs (step S1).

At this point, for example, the identifier having the value of "1" is added to the arbitrarily-selected information for the 1 ch, and the identifier having the value of "0" is added to the remaining pieces of information for the 1023 chs.

Subsequently, the information processing device 100 holds the pieces of information for the 1024 chs and the identifiers added to the pieces of information in the input memories 20000 to 21023 for the 1024 chs (step S2).

Subsequently, the information processing device 100 causes the processing unit 1 to read the information and the identifier from the input memories 20000 to 21023 and process the information (step S3).

At this point, the processing unit 1 does not change the identifier.

Subsequently, the information processing device 100 causes the processing unit 1 to write the post-processing pieces of information for 1024 chs and the identifiers added to the pieces of post-processing information in the output memories 30000 to 31023 (step S4).

At this point, the processing unit 1 writes the post-processing information of the N ch and the identifier added to the post-processing information in the output memory of the N ch.

Subsequently, the information processing device 100 causes the identifier inspecting and verifying unit 3 to inspect and verify the inspecting and verifying target identifier held in the output memory (step S5).

At this point, the inspecting and verifying target identifier is the identifier held in the output memory that corresponds to the input memory holding the identifier having the value of "1" (the ch is the same).

Subsequently, the information processing device 100 causes the identifier inspecting and verifying unit 3 to determines whether the inspecting and verifying target identifier held in the output memory is matched with the identifier held in the corresponding input memory (step S6).

In accordance with a determination that both the identifiers are matched with each other (Yes in step S6), the information processing device 100 causes the identifier inspecting and verifying unit 3 to determine that the processing unit 1 is normal, and proceeds to step S8.

On the other hand, in accordance with a determination that both the identifiers are not matched with each other (No in step S6), the information processing device 100 causes the identifier inspecting and verifying unit 3 to determine that the processing unit 1 fails.

In this case, the information processing device 100 causes the error processing unit 4 to perform the error processing on the post-processing information to which the inspecting and verifying target identifier is added (step S7), and proceeds to step S8.

The information processing device 100 causes the identifier adding unit 2 to perform the switching processing (step S8).

Specifically, similarly to step S1, the identifier adding unit 2 adds the identifier having the value of "1" to the information for the 1 ch to which the identifier having the value of "1" among the subsequently-input pieces of information for the 1024 chs is not added, and adds the identifier having the value of "0" to the remaining pieces of information for the 1023 chs.

Furthermore, the information processing device 100 performs the pieces of processing in steps S2 to S7 on the above addition performed by the identifier adding unit 2.

The information processing device 100 determines whether the identifiers held in the output memories for all the chs (1024 chs) are inspected and verified (step S9).

In accordance with a determination that all the chs are not inspected and verified (No in step S9), it is meant that the output memory that holds the identifier that does not become the inspecting and verifying target identifier exists, and the processing returns to step S8.

On the other hand, in accordance with a determination that all the chs are inspected and verified (Yes in step S9), the information processing device 100 ends the processing.

According to the first embodiment, whether the information to which the identifier is added is the target information, namely, whether the information to which the identifier is added is the information to be held in the output memory can securely be determined by inspecting and verifying one of the identifiers held in the output memories.

Thus, the failure of the processing unit 1 that processes the plurality of pieces of information can be discovered in a short time.

Additionally, handling means can be provided when the failure of the processing unit 1 is discovered.

Additionally, the identifiers to be inspected and verified can be switched, so that the failure of the processing unit 1 can be determined for all the input pieces of information.

Second Embodiment

In a second embodiment, a difference from the first embodiment will mainly be described, and the overlapping description will be omitted.

The second embodiment differs from the first embodiment in that the identifiers 60000 to 61023 are 2-bit binary data taking four values of "11", "10", "01", or "00".

The identifiers having the values of "11", "10", "01", are the valid identifier, and the identifier having the value of "00" is the invalid identifier.

Figure 4:
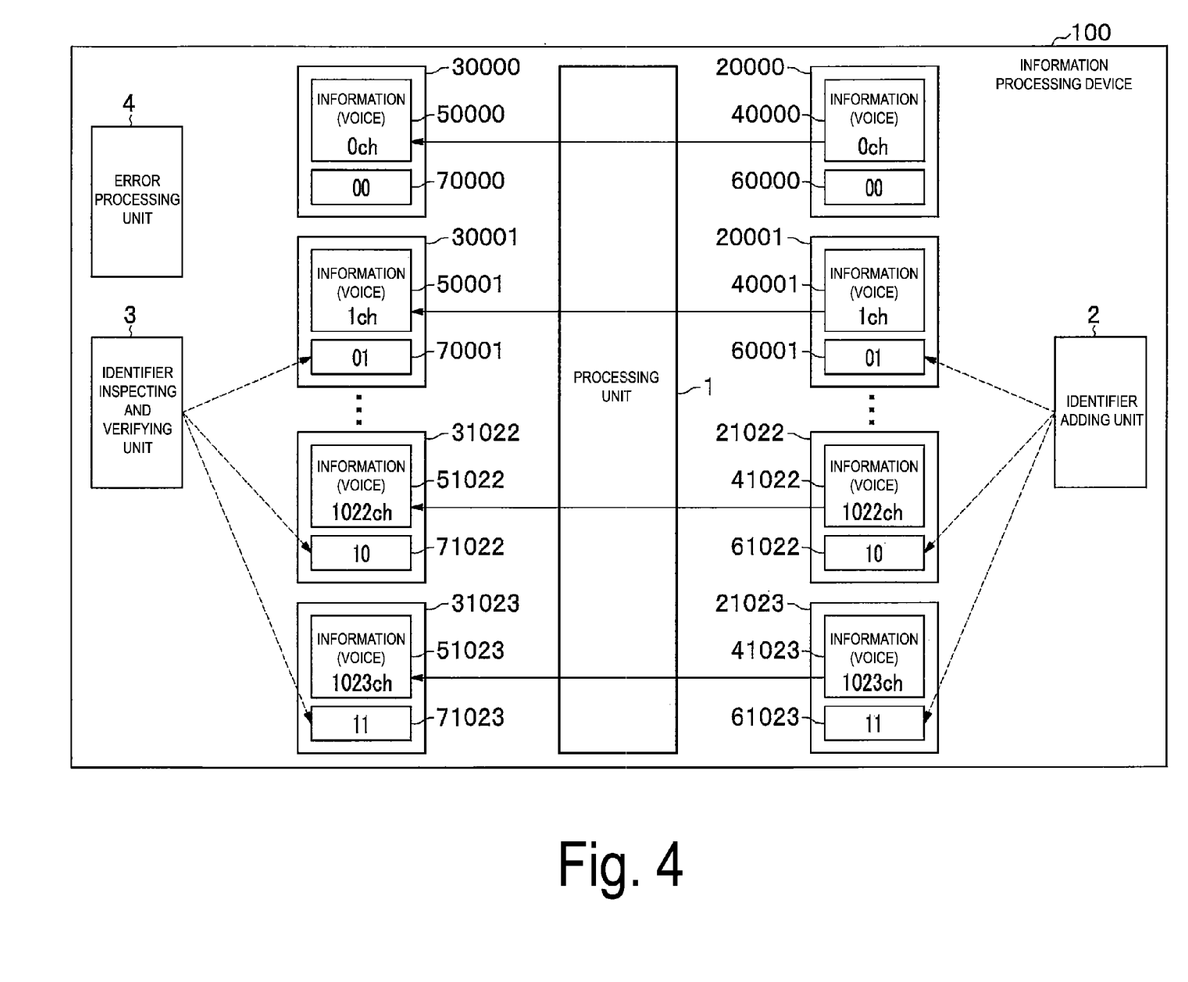
FIG. 4 is a functional configuration diagram illustrating an example of an information processing device according to a second embodiment, and is an explanatory view illustrating the case where a processing unit is normal.

As illustrated in FIG. 4, similarly to the first embodiment, the information processing device 100 of the present embodiment includes the processing unit 1, the input memories 20000 to 21023, the output memories 30000 to 31023, the identifier adding unit 2, the identifier inspecting and verifying unit 3, and the error processing unit 4.

The identifier adding unit 2 can set one of the identifiers 60000 to 61023 to the valid identifier having the value of "11", set another one to the valid identifier having the value of "10", set still another one to the valid identifier having the value of "01", and set the remaining identifiers to the invalid identifier having the value of "00".

In the example of FIG. 4, the valid identifier 60001 having the value of "01" is added to the information 40001, and the information 40001 and the identifier 60001 are held in the input memory 20001 of the 1 ch.

Furthermore, the valid identifier 61022 having the value of "10" is added to the information 40122, and the information 40122 and the identifier 61022 are held in the input memory 21022 of the 1022 ch.

Furthermore, the valid identifier 61023 having the value of "11" is added to the information 40123, and the information 40123 and the identifier 61023 are held in the input memory 21023 of the 1023 ch.

Furthermore, the invalid identifiers 60000, 60002 to 61021 having the value of "00" are added to the pieces of information 40000, 40002 to 41021, and the pieces of information 40000, 40002 to 41021 and the identifiers 60000, 60002 to 61021 are held in the input memories 20000, 20002 to 21021 of the 0 ch, the 2 ch to the 1021 ch, respectively.

The identifier inspecting and verifying unit 3 inspects and verifies three of the identifiers 70000 to 71023 held in the output memories 30000 to 31023 as the inspecting and verifying target identifier.

The output memory in which the inspecting and verifying target identifier is held is an output memories corresponding to the input memories holding the valid identifier having the values of "11", "10", "01" (for example, a ch number is the same).

The identifier inspecting and verifying unit 3 compares the inspecting and verifying target identifier held in the output memory to the valid identifier held in the input memory corresponding to the output memory, and inspects and verifies the inspecting and verifying target.

Operation examples of the information 40001 on the 1 ch held in the input memory 20001 of the 1 ch and the identifier 60001 that is added to information 40001 and has the value of "01", the information 41022 on the 1022 ch held in the input memory 21022 of the 1022 ch and the identifier 61022 that is added to information 41022 and has the value of "10", and the information 41023 on the 1023 ch held in the input memory 21023 of the 1023 ch and the identifier 61023 that is added to information 41023 and has the value of "11" will be described below with reference to FIG. 4.

When the processing unit 1 is normal, the processing unit 1 reads the information 40001 on the 1 ch and the identifier 60001 from the input memory 20001 of the 1 ch, and processes the information 40001 on the 1 ch and the identifier 60001.

After performing the processing, the processing unit 1 writes the post-processing information 50001 on the 1 ch and the identifier 70001 that is not changed from the value of "01" in the output memory 30001 of the 1 ch.

Since the identifier 60001 held in the input memory 20001 of the 1 ch is the valid identifier having the value of "01", the identifier inspecting and verifying unit 3 treats the identifier 70001 held in the output memory 30001 of the 1 ch as the inspecting and verifying target identifier. The identifier inspecting and verifying unit 3 reads the identifier 70001 added to the post-processing information 50001 on the 1 ch from the output memory 30001 of the 1 ch, and determines whether the identifier 70001 is matched with the identifier 60001 that is held in the input memory 20001 of the 1 ch and added to the pre-processing information on the 1 ch.

In this case, since the identifiers 70001, 60001 having the value of "01" are matched with each other, the processing unit 1 is determined to be normal.

The identifier inspecting and verifying unit 3 also determines that the post-processing information 50001 on the 1 ch held in the output memory 30001 of the 1 ch corresponds to the pre-processing information 40001 on the 1 ch held in the input memory 20001 of the 1 ch.

Similarly, the processing unit 1 reads the information 41022 on the 1022 ch and the identifier 61022 from the input memory 21022 of the 1022 ch, and processes the information 41022 on the 1022 ch and the identifier 61022.

After performing the processing, the processing unit 1 writes the post-processing information 51022 on the 1022 ch and the identifier 71022 that is not changed from the value of "10" in the output memory 31022 of the 1022 ch.

Since the identifier 61022 held in the input memory 21022 of the 1022 ch is the valid identifier having the value of "10", the identifier inspecting and verifying unit 3 treats the identifier 71022 held in the output memory 31022 of the 1022 ch as the inspecting and verifying target identifier. The identifier inspecting and verifying unit 3 reads the identifier 71022 added to the post-processing information 51022 on the 1022 ch from the output memory 31022 of the 1022 ch, and determines whether the identifier 71022 is matched with the identifier 61022 that is held in the input memory 21022 of the 1022 ch and added to the pre-processing information on the 1022 ch. In this case, since the identifiers 71022, 61022 having the value of "10" are matched with each other, the processing unit 1 is determined to be normal.

The identifier inspecting and verifying unit 3 also determines that the post-processing information 51022 on the 1022 ch held in the output memory 31022 of the 1022 ch corresponds to the pre-processing information 41022 on the 1022 ch held in the input memory 21022 of the 1022 ch.

Similarly, the processing unit 1 reads the information 41023 on the 1023 ch and the identifier 61023 from the input memory 21023 of the 1023 ch, and processes the information 41023 on the 1023 ch and the identifier 61023.

After performing the processing, the processing unit 1 writes the post-processing information 51023 on the 1023 ch and the identifier 71023 that is not changed from the value of "11" in the output memory 31023 of the 1023 ch.

Since the identifier 61023 held in the input memory 21023 of the 1023 ch is the valid identifier having the value of "11", the identifier inspecting and verifying unit 3 treats the identifier 71023 held in the output memory 31023 of the 1023 ch as the inspecting and verifying target identifier. The identifier inspecting and verifying unit 3 reads the identifier 71023 added to the post-processing information 51023 on the 1023 ch from the output memory 31023 of the 1023 ch, and determines whether the identifier 71023 is matched with the identifier 61023 that is held in the input memory 21023 of the 1023 ch and added to the pre-processing information on the 1023 ch.

In this case, since the identifiers 71023, 61023 having the value of "11" are matched with each other, the processing unit 1 is determined to be normal.

The identifier inspecting and verifying unit 3 also determines that the post-processing information 51023 on the 1023 ch held in the output memory 31023 of the 1023 ch corresponds to the pre-processing information 41023 on the 1023 ch held in the input memory 21023 of the 1023 ch.

Figure 5:
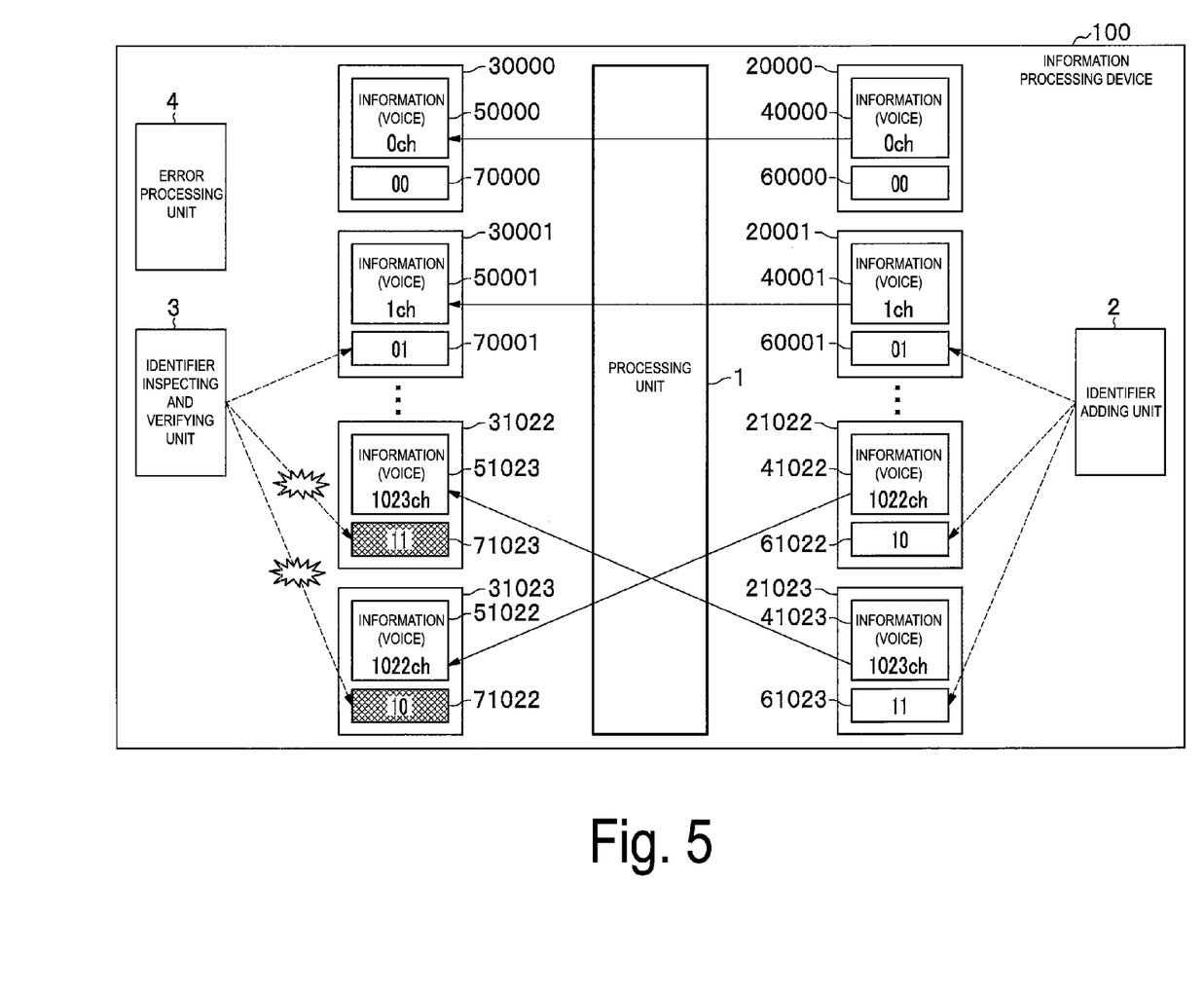
FIG. 5 is an explanatory view illustrating the case where the processing unit fails in the second embodiment.

When the processing unit 1 fails, as illustrated in FIG. 5, it is assumed that the output memory 31022 of the 1022 ch holds the post-processing information 51023 on the 1023 ch and the identifier 71023, which is added to the information 51023 and has the value of "11".

The identifier inspecting and verifying unit 3 inspects and verifies the identifier 71023 read from the output memory 31022 of the 1022 ch as the inspecting and verifying target identifier.

In this case, the value of "11" possessed by the identifier 71023 read from the output memory 31022 of the 1022 ch is not matched with the value of "10" possessed by the identifier 61022 that is held in the input memory 21022 of the 1022 ch and added to the pre-processing information 41022 on the 1022 ch.

For this reason, the identifier inspecting and verifying unit 3 determines that the processing unit 1 fails.

The identifier inspecting and verifying unit 3 also determines that the post-processing information 51023 on the 1023 ch held in the output memory 31022 of the 1022 ch does not correspond to the pre-processing information 41022 on the 1022 ch held in the input memory 21022 of the 1022 ch.

Thus, the error processing unit 4 performs the error processing on the post-processing information 51023 on the 1023 ch held in the output memory 31022 of the 1022 ch.

Similarly, as illustrated in FIG. 5, it is assumed that the output memory 31023 of the 1023 ch holds the post-processing information 51022 on the 1022 ch and the identifier 71022, which is added to the information 51022 and has the value of "10".

The identifier inspecting and verifying unit 3 inspects and verifies the identifier 71022 read from the output memory 31023 of the 1023 ch as the inspecting and verifying target identifier.

In this case, the value of "10" possessed by the identifier 71022 read from the output memory 31023 of the 1023 ch is not matched with the value of "11" possessed by the identifier 61023 that is held in the input memory 21023 of the 1023 ch and added to the pre-processing information 41023 on the 1023 ch.

For this reason, the identifier inspecting and verifying unit 3 determines that the processing unit 1 fails.

The identifier inspecting and verifying unit 3 also determines that the post-processing information 51022 on the 1022 ch held in the output memory 31023 of the 1023 ch does not correspond to the pre-processing information 41023 on the 1023 ch held in the input memory 21023 of the 1023 ch.

Thus, the error processing unit 4 performs the error processing on the post-processing information 51022 on the 1022 ch held in the output memory 31023 of the 1023 ch.

The identifier adding unit 2 can switch the identifiers having the values of "01", "10", "11" among the identifiers 60000 to 61023 over time.

For example, the identifier adding unit 2 can switch the identifiers having the values of "01", "10", "11" from the identifiers 61001, 61021, 61022 to the identifiers 60002 to 60004.

In this case, the values of the identifiers 60001, 60005 to 61023 become "00".

Since the identifiers 60002 to 60004 held in the input memories 20002 to 20004 of the 2 ch to the 4 ch are the valid identifiers having the values of "01", "10", "11", respectively, the identifier inspecting and verifying unit 3 treats the identifiers 70002 to 70004 held in the output memories 30002 to 30004 of the 2 ch to 4 ch as the inspecting and verifying target identifier after the processing unit 1 performs the processing.

The identifier inspecting and verifying unit 3 determines that the processing unit 1 is normal when the values of the identifiers 70002 to 70004 are matched with the identifiers held in the input memories 20002 to 20004 of the 2 ch to the 4 ch.

On the other hand, when the values of the identifiers 70002 to 70004 are not matched with the identifiers held in the input memories 20002 to 20004 of the 2 ch to the 4 ch, the identifier inspecting and verifying unit 3 determines that the processing unit 1 fails, and the error processing unit 4 can perform the error processing.

Furthermore, the identifier adding unit 2 can switch the identifiers having the values of "01", "10", "11" to three of the identifiers 60000, 60005 to 61021 other than the identifier 60001 to 60004, 61022, 61023, and the identifier inspecting and verifying unit 3 can perform the inspection and verification.

The identifier can be inspected and verified in any order.

As a result, the inspection and verification of all the 1024 chs can be performed, and the determination whether the processing unit 1 is normal can be made without any omission.

Processing

The processing of the information processing device 100 of the second embodiment will be described below with reference to FIG. 6.

The processing starts when the pieces of information for the 1024 chs are input to the information processing device 100.

First, the information processing device 100 causes the identifier adding unit 2 to add the identifier having the value of "00", "01", "10", "11" to each of the pieces of information for the 1024 chs (step S11).

At this point, for example, the identifier having the value of "01", "10", "11" is added to the arbitrarily-selected pieces of information for the 3 chs, and the identifier having the value of "00" is added to the remaining pieces of information for the 1021 chs.

Figure 3:
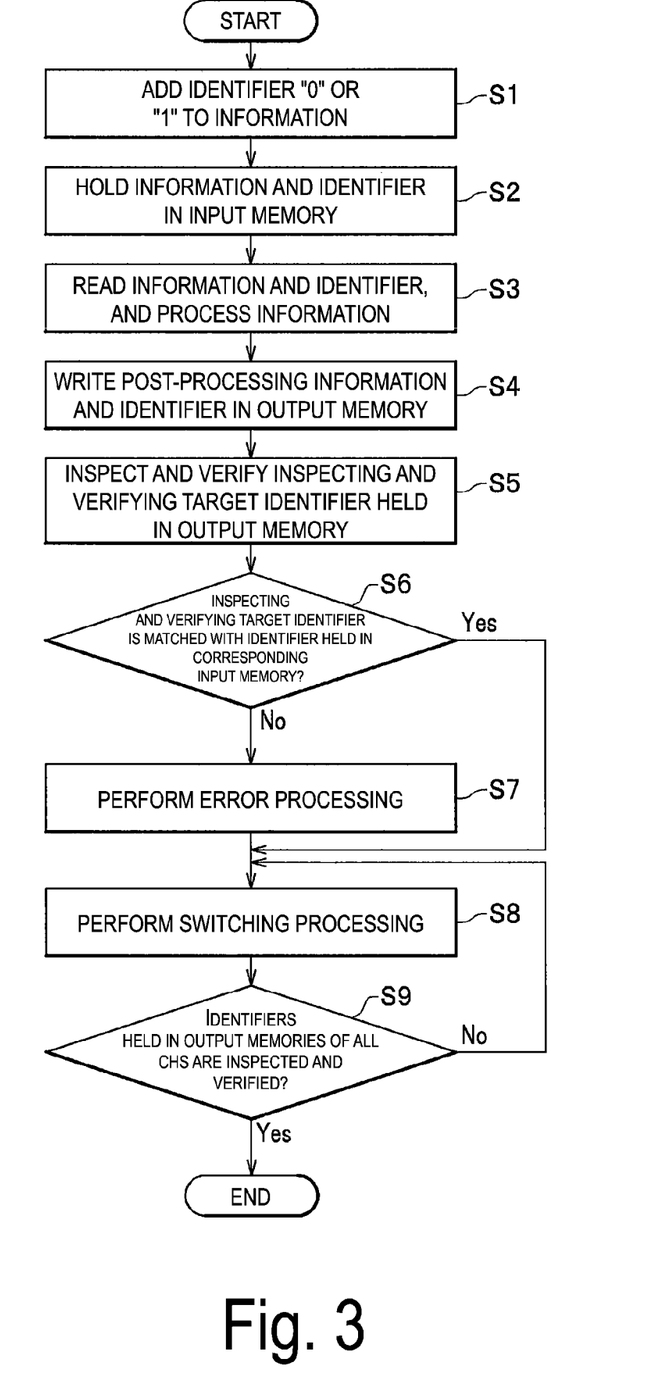
FIG. 3 is a flowchart illustrating processing of the information processing device of the first embodiment.

Subsequently, the pieces of processing in steps S2 to S9 of FIG. 3 are performed similarly to the first embodiment.

In step S5, the inspecting and verifying target identifier is the identifier held in the output memory corresponding to the input memory holding each of the identifiers having the values of "01", "10", or "11" (the ch is the same).

In the switching processing (step S8), the identifier adding unit 2 adds one of the identifiers having the values of "01", "10", and "11" to each of the pieces of information for 3 chs to which the identifier having the values of "01", "10", and "11" are not added among the subsequently-input pieces of information for the 1024 chs, and adds the identifiers having the value of "00" to the remaining pieces of information for the 1021 chs.

According to the second embodiment, as compared with the first embodiment, whether the information to which the identifier is added is the target information, namely, whether the information to which the identifier is added is the information to be held in the output memory can securely be determined by inspecting and verifying three of the identifiers held in the output memories.

Others (a) In the first embodiment, the identifiers 60000 to 61023 added to the pieces of information 40000 to 41023 using the identifier adding unit 2 are the 1-bit binary data. In the second embodiment, the identifiers 60000 to 61023 are the 2-bit binary data.

Alternatively, for example, the identifiers 60000 to 61023 may be binary data of 3 bits or more. When the number of bits of the identifiers 60000 to 61023 is increased, the types of identifier can be increased, and the types of valid identifier can be increased.

Thus, the number of inspecting and verifying target identifiers inspected and verified by the identifier inspecting and verifying unit 3 can be increased, and the number of pieces of information (the number of chs) that can be simultaneously inspected and verified can be increased for the input pieces of information for the 1024 chs.

As a result, the total time required for the processing of inspecting and verifying the pieces of information for all the 1024 chs can be shortened.

(b) The identifiers 60000 to 61023 added to the pieces of information 40000 to 41023 using the identifier adding unit 2 may be data other than the binary data.

(c) The valid identifier included in the identifier added to each of the input pieces of information for 1024 chs may be one type or two or more types.

Figure 6:
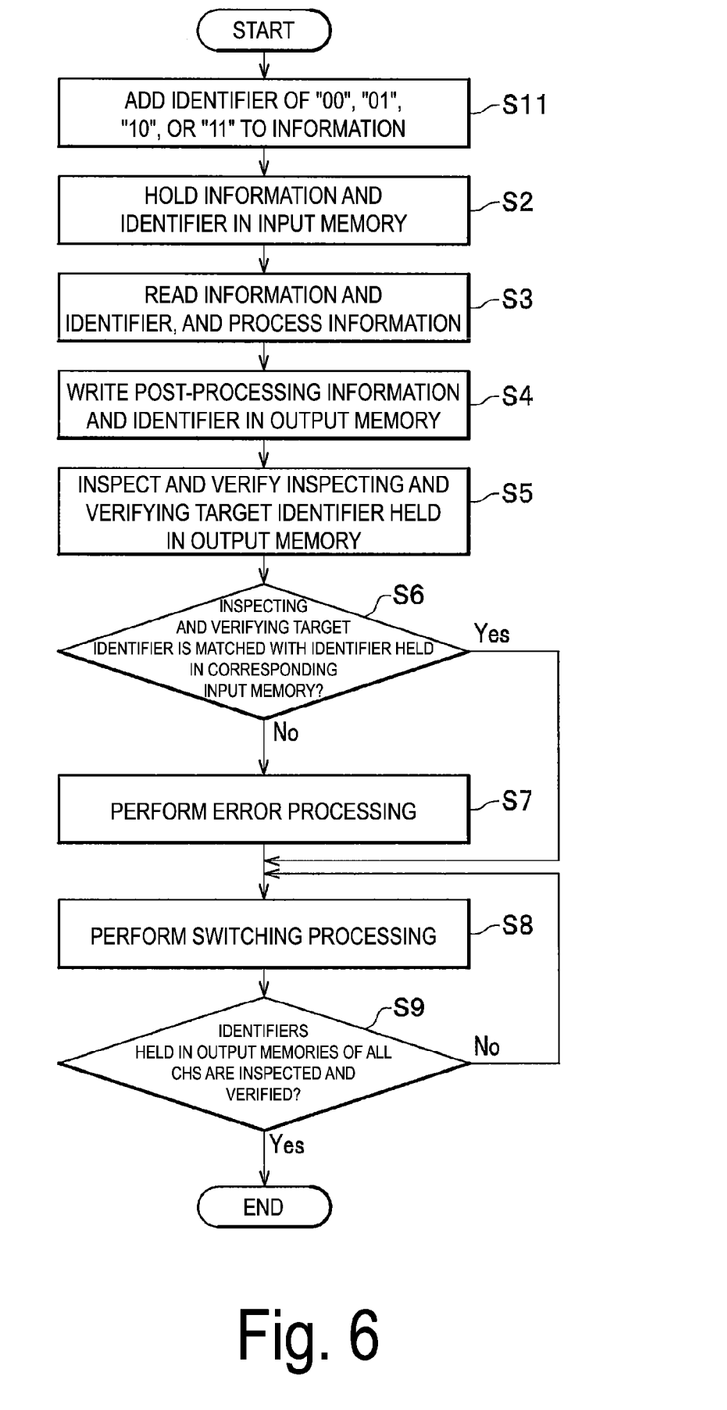
FIG. 6 is a flowchart illustrating processing of the information processing device of the second embodiment.

(d) In each embodiment, using the error processing unit 4, the information processing device 100 performs the error processing on the post-processing information to which the inspecting and verifying target identifier is added (see step S7 in FIGS. 3 and 6).

However, for example, when the identifier of the 1 ch is not matched with the identifier held in the corresponding output memory, the error processing unit 4 may perform the error processing as the entire information processing device 100.

(e) In the processing of the first embodiment, the information processing device 100 determines whether the identifiers held in the output memories for all the chs (1024 chs) are inspected and verified.

However, the inspection and verification may be omitted for the ch that is clearly non-used.

For example, when only a first half of the 0 ch to the 511 ch in the total 1024 chs is used while a second half of the 512 ch to the 1023 ch is not used, namely, when the input memories and output memories of the 0 ch to the 511 ch hold the pieces of information and the identifiers while the input memories and output memories of the 512 ch to the 1023 ch do not hold the pieces of information and the identifiers, the inspection and verification may be performed only for the 0 ch to the 511 ch, and the inspection and verification may be omitted for the 512 ch to the 1023 ch.

The omission of the inspection and verification may also be applied to the second embodiment.

(f). Techniques obtained by appropriately combining various techniques described in the embodiments can also be achieved.

REFERENCE SIGNS LIST

100 information processing device
1 processing unit
2 identifier adding unit
3 identifier inspecting and verifying unit
4 error processing unit
20000 to 21023 input memory
30000 to 31023 output memory
40000 to 41023 (pre-processing) information
50000 to 51023 (post-processing) information
60000 to 61023 identifier (held in input memory)
70000 to 71023 identifier (held in output memory)

The invention claimed is:

1. An information processing device comprising:
    a processing unit configured to process a plurality of pieces of information;
    an identifier adding unit configured to add an identifier to each of the plurality of pieces of information, comprising:
        adding a respective valid identifier to each of a first subset of pieces of information in the plurality of pieces of information; and
        adding an invalid identifier to each of a second subset of pieces of information in the plurality of pieces of information;
    a plurality of input memories configured to hold each of the plurality of pieces of information and each of the identifiers added to the plurality of pieces of information;
    a plurality of output memories configured to hold each of the plurality of pieces of information processed by the processing unit and each of the identifiers added to the plurality of pieces of information processed by the processing unit; and
    an identifier inspecting and verifying unit configured to perform inspection and verification by identifying an identifier that becomes an inspecting and verifying target identifier among the identifiers held in the output memories, and comparing the inspecting and verifying target identifier to a valid identifier held in an input memory of the plurality of input memories corresponding to an output memory of the plurality of output memories that holds the inspecting and verifying target identifier.

2. The information processing device according to claim 1, further comprising an error processing unit configured to perform error processing when the inspecting and verifying target identifier is not matched with the valid identifier held in the input memory corresponding to the output memory that holds the inspecting and verifying target identifier.

3. The information processing device according to claim 1, wherein the identifier adding unit adds the valid identifier to the pieces of information held in the input memory other than at least one input memory that holds the valid identifier.

4. An information processing method at an information processing device including a processing unit that processes a plurality of pieces of information, the information processing method comprising, at the information processing device:

adding an identifier to each of the plurality of pieces of information, comprising:
  adding a respective valid identifier to each of a first subset of pieces of information in the plurality of pieces of information; and
  adding an invalid identifier to each of a second subset of pieces of information in the plurality of pieces of information;
holding each of the plurality of pieces of information and each of the identifiers added to the plurality of pieces of information in a plurality of input memories;
holding each of the plurality of pieces of information processed by the processing unit and each of the identifiers added to the plurality of pieces of information processed by the processing unit in a plurality of output memories; and
performing inspection and verification by identifying an identifier that becomes an inspecting and verifying target identifier among the identifiers held in the output memories, and comparing the inspecting and verifying target identifier to a valid identifier held in an input memory of the plurality of input memories corresponding to an output memory of the plurality of output memories that holds the inspecting and verifying target identifier.

5. The information processing method according to claim 4, further including, at the information processing device, performing error processing when the inspecting and verifying target identifier is not matched with the valid identifier held in the input memory corresponding to the output memory that holds the inspecting and verifying target identifier.

6. The information processing method according to claim 4, wherein the adding of the identifier includes, at the information processing device, adding the valid identifier to the pieces of information held in the input memory other than at least one input memory that holds the valid identifier.

7. The information processing method according to claim 4, wherein:
  the identifier added to each of the plurality of pieces of information is a single bit having a 0 or 1 value.

8. The information processing method according to claim 4, wherein adding an identifier to each of the plurality of pieces of information comprises:
  adding a valid identifier to one of the plurality of pieces of information; and
  adding an invalid identifier to each of the other pieces of information in the plurality of pieces of information.

* * * * *